No. 749,758. PATENTED JAN. 19, 1904.
W. G. TEMPLETON.
IRRIGATING DEVICE.
APPLICATION FILED SEPT. 18, 1902.
NO MODEL.
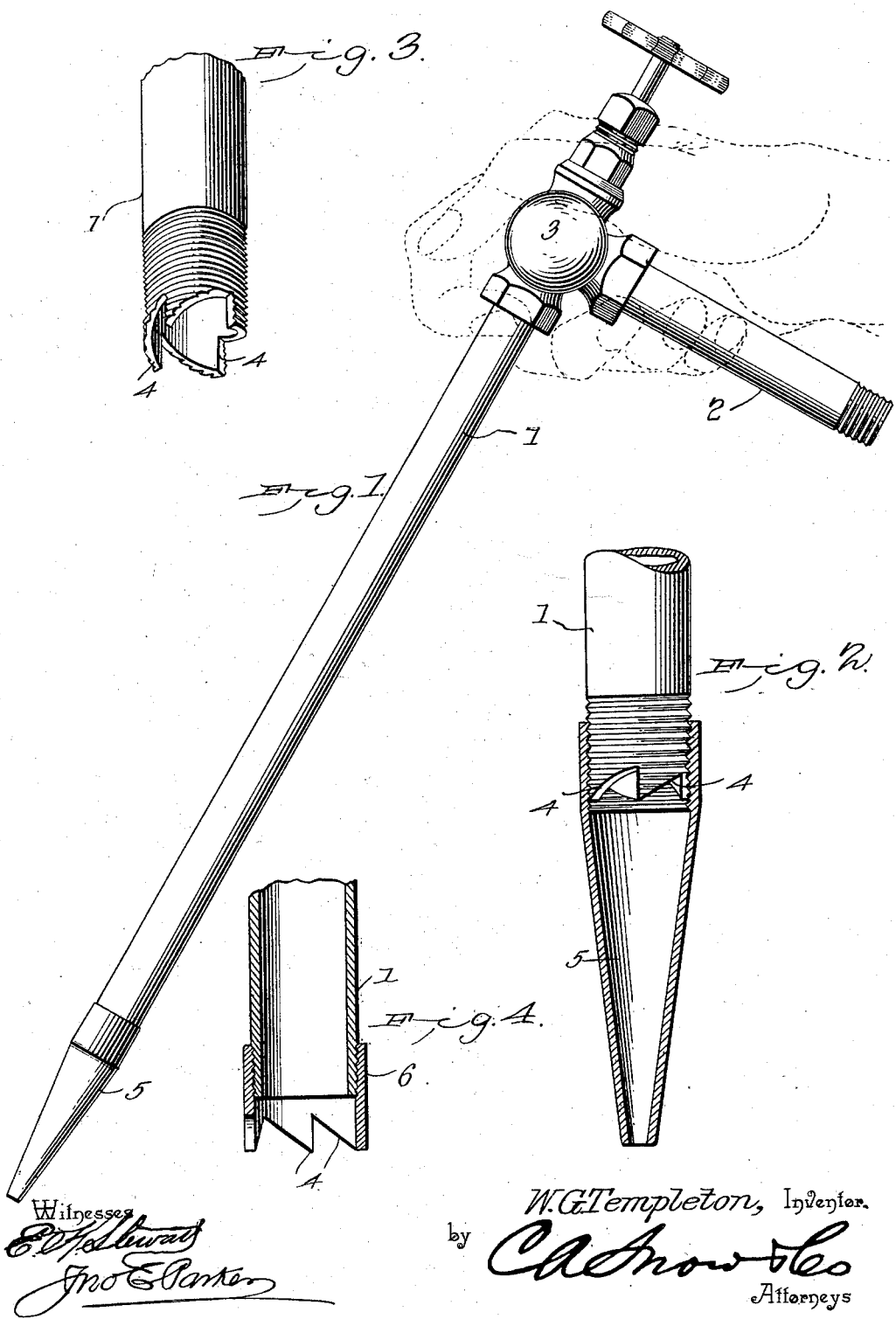

No. 749,758. Patented January 19, 1904.

UNITED STATES PATENT OFFICE.

WILLIAM G. TEMPLETON, OF COLORADO SPRINGS, COLORADO.

IRRIGATING DEVICE.

SPECIFICATION forming part of Letters Patent No. 749,758, dated January 19, 1904.

Application filed September 18, 1902. Serial No. 123,917. (No model.)

*To all whom it may concern:*

Be it known that I, WILLIAM G. TEMPLETON, a citizen of the United States, residing at Colorado Springs, in the county of El Paso and State of Colorado, have invented a new and useful Irrigating Device, of which the following is a specification.

The invention relates to certain improvements in irrigating implements of that class in which a tube is forced into the ground at a point adjacent to the roots of a tree or plant for the purpose of supplying water directly to the root to prevent the waste which occurs when the water is allowed to flow directly on the surface of the ground and at the same time by providing nourishment below the surface causing the growth of the roots in a downward direction and lessening the tendency to surface spreading.

The principal object of the invention is to provide an implement of simple construction which may be readily introduced to any desired depth and by which the quantity of water used may be regulated as desired.

A further object of the invention is to provide a device of this character wherein the force of the stream of water passing through the implement may be used to cut a passageway into the ground, and thus reduce the labor involved in the use of the implement; and a still further object is to so construct the implement as to permit its ready introduction into hard or clay soils, where the stream of water alone is not sufficient to cut a passageway for the implement.

With these and other objects in view the invention consists in the novel construction and arrangement of parts hereinafter described, illustrated in the accompanying drawings, and particularly pointed out in the appended claims, it being understood that various changes in the form, proportions, size, and minor details of the structure may be made without departing from the spirit or sacrificing any of the advantages of the invention.

In the accompanying drawings, Figure 1 is a perspective view of an irrigating device constructed in accordance with my invention. Fig. 2 is a sectional elevation of the lower portion of the same. Fig. 3 is a detail perspective view of the lower portion of the water-tube with the introducing-nozzle removed. Fig. 4 is a detail view illustrating a slight modification of the construction of the introducing-tube.

Similar numerals of reference are employed to indicate corresponding parts throughout the several figures of the drawings.

The implement is formed of a pair of water-tubes 1 and 2, arranged at right angles to each other and connected by a valve-casing 3, containing any suitable form of valve, the handled stem of said valve being extended out through the upper portion of the valve-chamber in convenient position for use. The tube 1 is the introducing-tube and may be of any desired length, while the tube 2 is of short length and adapted for attachment to a flexible water-hose, while at the same time its position and size are such as to permit its use as a handle for the introduction and withdrawal of the main tube. The lower end of the tube is notched to form a plurality of cutting-teeth 4 to assist in working the device into stiff soil, and in use the tube is given a slight circumferential movement, being worked back and forth and at the same time pressed down into the ground, the stream of water materially assisting the entrance of the tube into the ground and washing away the soil loosened by the teeth 4.

For light soils, and especially in sand, it is not necessary to use the cutting-teeth, and to permit the more ready introduction of the device the lower end of the tube 1 is provided with external screw-threads for the reception of a tapering nozzle 5, the discharge-mouth of which is provided with a sharpened edge in order that it may be readily forced into the ground. These devices are usually employed in connection with flexible hose connected to a source of water-supply, the water having sufficient head to readily loosen light or sandy soil and permit the introduction of the device into the ground.

In using the device the upper tube 2 is grasped in one hand and the lower end of the tube 1 gradually forced into the ground. The valve is in convenient position to be opened and closed by the hand grasping the tube 2. The current of water is generally under sufficient pressure to force a passage for the tube; but where the soil is heavy it is generally found necessary to remove the tapered nozzle and utilize the cutting-teeth to facilitate the introduction of the tube into the ground.

In Fig. 4 is illustrated a slight modification of the construction of the lower end of the introducing-tube. In this case the tube is provided with a removable section 6, in which the teeth 4 are formed so that the toothed section and the nozzle 5 may be interchangeable, if desired. This construction also permits of the substitution of toothed sections of different character or the use of a new section in place of one worn or broken.

Having thus described my invention, what I claim is—

1. An irrigating device comprising a water-conducting tube having its lower end notched to form a plurality of teeth and the outer portion of the tube being threaded, and a removable nozzle adapted to the threaded portion of said tube.

2. A manually-manipulated irrigating device, comprising a tube and a pair of interchangeable introducing members, one of said members being detachable from the tube, thereby to permit the employment of either member.

3. A manually-manipulated irrigating device comprising a pair of tubes disposed at an angle to each other, a valve-casing to which both of the tubes are connected and forming in connection with one of the tubes a handle member and a hose-attaching means, and the other of said tubes being provided with means for facilitating its entrance into the ground.

In testimony that I claim the foregoing as my own I have hereto affixed my signature in the presence of two witnesses.

WILLIAM G. TEMPLETON.

Witnesses:
C. E. DOYLE,
FRANK S. APPLEMAN.